(12) United States Patent
Shani et al.

(10) Patent No.: US 11,635,897 B2
(45) Date of Patent: Apr. 25, 2023

(54) SYSTEM AND METHOD FOR EFFICIENT IMPLEMENTATION OF XCOPY COMMANDS

(71) Applicant: EMC IP Holding Company, LLC, Hopkinton, MA (US)

(72) Inventors: Nimrod Shani, Ra'anana (IL); Shari A. Vietry, Merrimack, NH (US); Vikram A. Prabhakar, Cary, NC (US); Vamsi K. Vankamamidi, Hopkinton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/389,941

(22) Filed: Jul. 30, 2021

(65) Prior Publication Data

US 2023/0035390 A1 Feb. 2, 2023

(51) Int. Cl.
*G06F 3/06* (2006.01)
*G06F 16/22* (2019.01)
*G06F 9/46* (2006.01)

(52) U.S. Cl.
CPC .............. *G06F 3/061* (2013.01); *G06F 3/065* (2013.01); *G06F 3/0679* (2013.01); *G06F 9/467* (2013.01); *G06F 16/2255* (2019.01)

(58) Field of Classification Search
CPC ........ G06F 3/061; G06F 3/065; G06F 3/0679; G06F 9/467

USPC ......................................................... 711/154
See application file for complete search history.

(56) References Cited

U.S. PATENT DOCUMENTS

| | | | |
|---|---|---|---|
| 8,725,692 B1* | 5/2014 | Natanzon ............ | G06F 11/2082 707/610 |
| 9,535,801 B1* | 1/2017 | Natanzon ................ | G06F 11/00 |
| 10,146,454 B1* | 12/2018 | Koli ........................ | G06F 3/067 |
| 2015/0370492 A1* | 12/2015 | Satnur ................... | G06F 3/0659 711/114 |
| 2020/0159414 A1* | 5/2020 | Hu ....................... | G06F 16/9014 |

* cited by examiner

*Primary Examiner* — Than Nguyen
(74) *Attorney, Agent, or Firm* — Brian J. Colandreo; Mark H. Whittenberger; Holland & Knight LLP (57) ABSTRACT

A method, computer program product, and computer system for receiving an XCopy command is provided. The XCopy command may be in the form of an IO operation. The IO operation may be a subextent block operation. A source range and a destination range of the XCopy command may be determined to be aligned within an alignment boundary. The Xcopy command may be determined to be smaller than a predetermined size. In response to determining the source range and destination range of the XCopy command are aligned within the alignment boundary and the XCopy command is smaller than a predetermined size, the XCopy command may be processed. The receiving of the XCopy command may be recorded in a log.

20 Claims, 7 Drawing Sheets

SYSTEM AND METHOD FOR EFFICIENT IMPLEMENTATION OF XCOPY COMMANDS

BACKGROUND

Storing and safeguarding electronic content may be beneficial in modern business and elsewhere. Accordingly, various methodologies may be employed to protect and distribute such electronic content. For example, filesystems and platforms may rely extensively on XCopy command operations to offload copy functionality to storage arrays. As such, efficient implementation of XCopy commands is essential. For example, efficient implementation of XCopy commands allows for the filesystems and platforms to improve their performance and increase scale (e.g., number of virtual machines deployed). However, implementing XCopy commands may involve reading source logical block addresses (LBA) and writing read data into destination LBAs. This approach may add significant performance overhead, which may limit bandwidth of the XCopy command and impact performance and scalability of applications utilizing a storage system.

BRIEF SUMMARY OF DISCLOSURE

In one example implementation, a method, performed by one or more computing devices, may include but is not limited to receiving an XCopy command, via a computing device. The XCopy command may be in the form of an IO operation. The IO operation may be a subextent operation. A source range and a destination range of the XCopy command may be determined to be aligned within an alignment boundary. The XCopy command may be determined to be smaller than a predetermined size. In response to determining the source range and the destination range of the XCopy command are aligned within the alignment boundary and the XCopy command is smaller than a predetermined size, the XCopy command may be processed. Receiving of the XCopy command may be recorded in a log.

One or more of the following example features may be included. The XCopy command may be received without performing a read of a source logical block address (LBA) associated with the XCopy command and without writing read data of the XCopy command to a destination LBA. A distributed shared lock on a source volume associated with a source of the XCopy command may be acquired. A distributed exclusive lock on a destination volume page associated with a destination of the XCopy command may be acquired. Acquiring a distributed shared lock on a source volume associated with a source of the XCopy command may be configured to not load a page from the source volume associated with the source of the XCopy command. A hash table may be updated using the source range and the destination range. Before recording in the log that the XCopy command was received, it may be determined if there is a barrier logical sequence number (LSN) within a transactional cache to be flushed. A read of the XCopy command may be paused. A logical sequence number (LSN) associated with a destination of the XCopy command may be flushed.

In another example implementation, a computer program product may reside on a computer readable storage medium having a plurality of instructions stored thereon which, when executed across one or more processors, may cause at least a portion of the one or more processors to perform operations that may include but are not limited to receiving an XCopy command. The XCopy command may be in the form of an IO operation. The IO operation may be a subextent block operation. A source range and a destination range of the XCopy command may be determined to be aligned within an alignment boundary. The XCopy command may be determined to be smaller than a predetermined size. In response to determining the source range and the destination range of the XCopy command are aligned within the alignment boundary and the XCopy command is smaller than a predetermined size, the XCopy command may be processed. Receiving of the XCopy command may be recorded in a log.

One or more of the following example features may be included. The XCopy command may be received without performing a read of a source logical block address (LBA) associated with the XCopy command and without writing read data of the XCopy command to a destination LBA. A distributed shared lock on a source volume associated with a source of the XCopy command may be acquired. A distributed exclusive lock on a destination volume page associated with a destination of the XCopy command may be acquired. Acquiring a distributed shared lock on a source volume associated with a source of the XCopy command may be configured to not load a page from the source volume associated with the source of the XCopy command. The processor may further be configured to update a hash table using the source range and the destination range. Before recording in the log that the XCopy command was received, it may be determined if there is a barrier logical sequence number (LSN) within a transactional cache to be flushed. The processor may be even further configured to pause a read of the XCopy command. A logical sequence number (LSN) associated with a destination of the XCopy command may be flushed.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
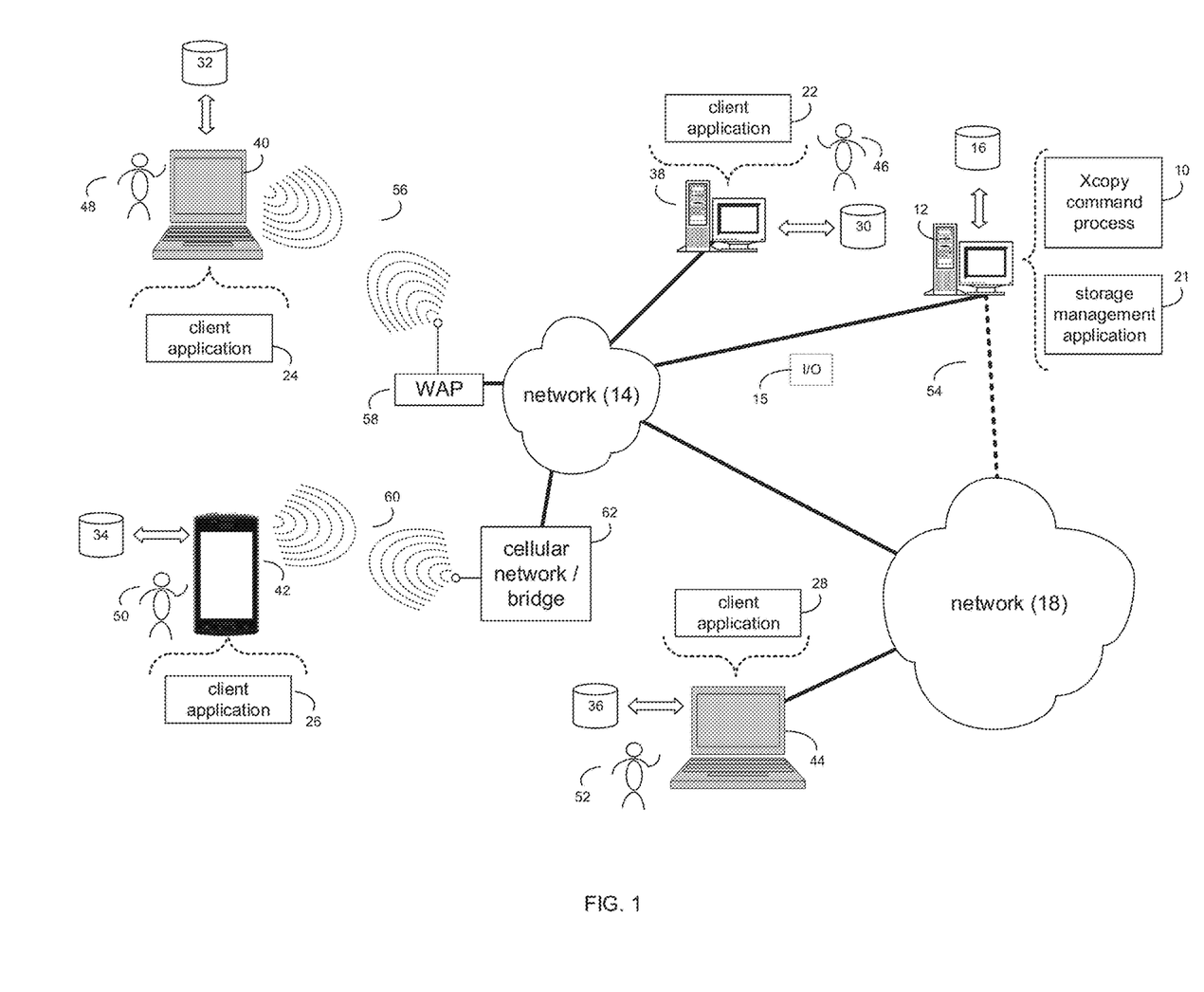
FIG. 1 is an example diagrammatic view of an efficient XCopy command process coupled to an example distributed computing network according to one or more example implementations of the disclosure.

Referring now to the example implementation of FIG. 1, there is shown an efficient of XCopy command process 10 (hereinafter "XCopy command process 10") implementation of XCopy command process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an XCopy command process, such as XCopy command process 10 of FIG. 1, may receive an XCopy command, via a computing device. The XCopy command may be in the form of an IO operation. The IO operation may be a subextent block operation. A source address range (hereinafter "source range") and a destination source range (hereinafter "destination range") of the XCopy command may be determined to be aligned within an alignment boundary. The XCopy command may be determined to be smaller than a predetermined size. In response to determining the source range and the destination range of the XCopy command are aligned within the alignment boundary and the XCopy command is smaller than a predetermined size, the XCopy command may be processed. Receiving of the XCopy command may be recorded in a log.

In some implementations, the instruction sets and subroutines of XCopy command process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, XCopy command process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, XCopy command process 10 and/or storage management application 21 may be accessed via one or more of client applications 22, 24, 26, 28. In some implementations, XCopy command process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within XCopy command process 10, a component of XCopy command process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of XCopy command process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of XCopy command process 10 (and vice versa). Accordingly, in some implementations, XCopy command process 10 may be a purely server-side application, a purely client-side application, or a hybrid server-side/client-side application that is cooperatively executed by one or more of client applications 22, 24, 26, 28 and/or XCopy command process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, XCopy command process 10, and storage management application 21, taken singly or in any combination, may effectuate some or all of the same functionality, any description of effectuating such functionality via one or more of client applications 22, 24, 26, 28, XCopy command process 10, storage management application 21, or combination thereof, and any described interaction(s) between one or more of client applications 22, 24, 26, 28, XCopy command process 10, storage management application 21, or combination thereof to effectuate such functionality, should be taken as an example only and not to limit the scope of the disclosure.

In some implementations, one or more of users 46, 48, 50, 52 may access computer 12 and XCopy command process 10 (e.g., using one or more of client electronic devices 38, 40, 42, 44) directly through network 14 or through secondary network 18. Further, computer 12 may be connected to network 14 through secondary network 18, as illustrated with phantom link line 54. XCopy command process 10 may include one or more user interfaces, such as browsers and textual or graphical user interfaces, through which users 46, 48, 50, 52 may access XCopy command process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
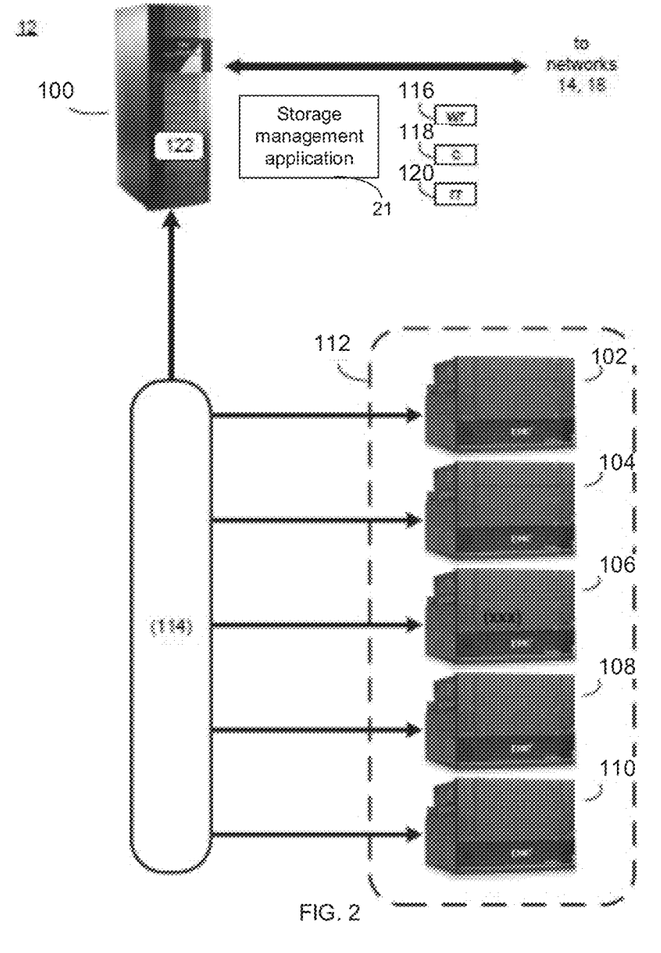
FIG. 2 is an example diagrammatic view of a storage system of FIG. 1 according to one or more example implementations of the disclosure.
Figure 3:
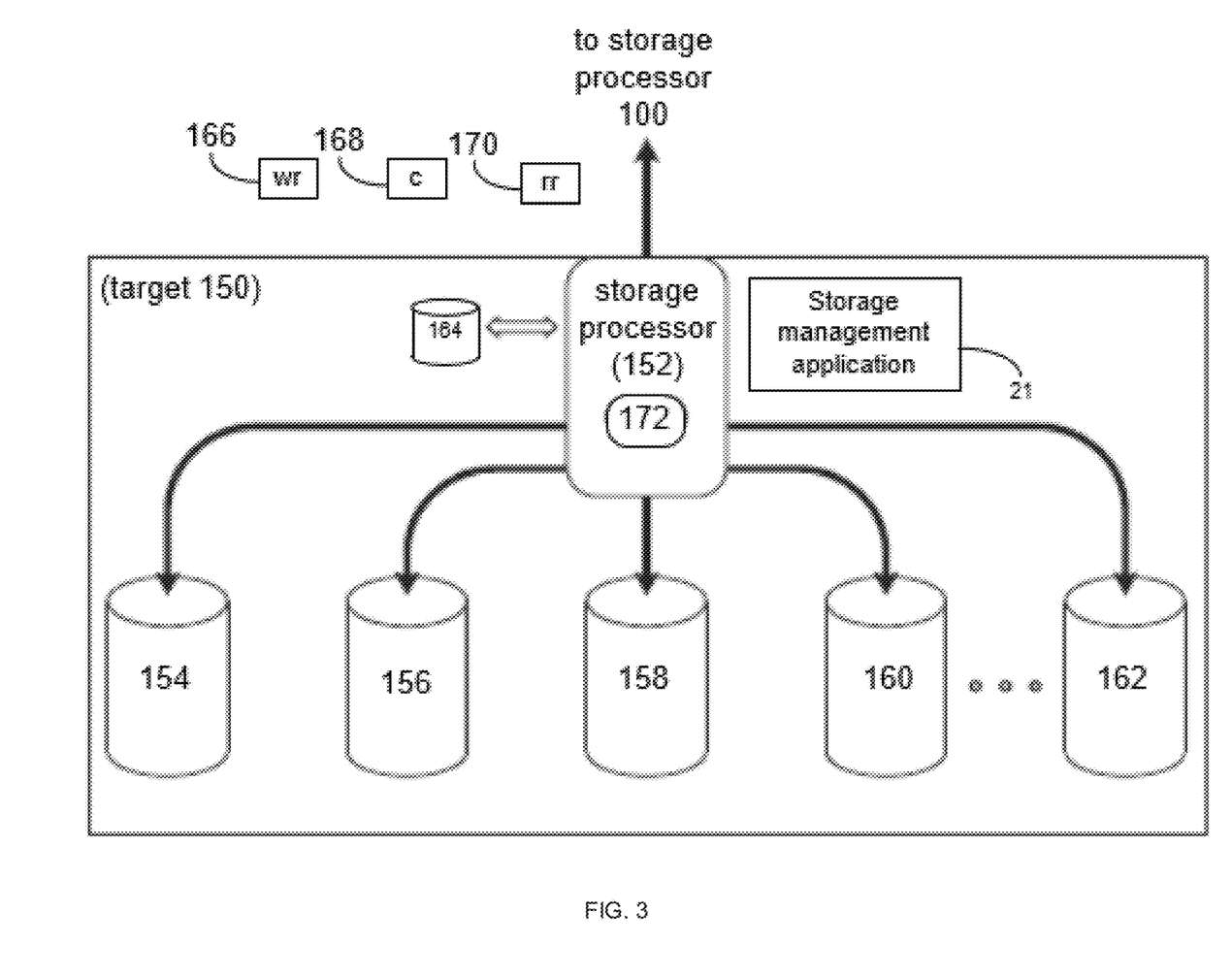
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or XCopy command process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Processing XCopy Commands

As mentioned above, filesystems and platforms may rely extensively on XCopy command operations to offload copy functionality to storage arrays. As is known in the art, an XCopy command is a command used to copy one or more filed or folder from one location to another location. As such, efficient implementation of XCopy commands is essential. For example, efficient implementation of XCopy commands allows for the filesystems and platforms to improve their performance and increase scale (e.g., number of virtual machines deployed). However, implementing XCopy commands may involve reading source logical block addresses (LBA) and writing read data (i.e., a write phase) into destination LBAs. During the write phase, deduplication may be performed such that the destination LBAs may be duped to the source LBAs. As such, while a goal of not consuming more storage for the copies of the data may be achieved through deduplication, there may be a significant cost with regards to reading physical large blocks (PLBs) associated with the source LBAs and then writing the PLBs back to destination LBAs. Further, this approach may add significant performance overhead, which may limit bandwidth of the XCopy command and impact performance and scalability of applications utilizing a storage system.

Additionally, an alignment region is an address range of a fixed size with predetermined boundaries. Alignment boundaries may be address boundaries within an address space (e.g., a universal address space) that are spaced apart from each other by a fixed alignment interval, such as, for example, 1 megabyte (MB). Thus, for example, every address that is an integer multiple of 1 MB may be an alignment boundary. In another example, the alignment interval may be a fixed length that may range between 1 MB and 8 MB.

The XCopy Command Process

As discussed above and referring also at least to the example implementations of FIGS. 4-7, XCopy command process 10 may receive 400 an XCopy command (e.g., XCopy command 500). XCopy command 500 may be received via a computing device. Further, XCopy command 500 may be received without performing a read of a source logical block address (LBA) associated with XCopy command 500 and without writing read data of XCopy command 500 to a destination LBA. XCopy command 500 may be directed at a range of addresses (typically addresses that are logically-adjacent within a single data object, such as within a single logical disk or logical unit number (LUN)). XCopy command 500 may indicate an XCopy operation to perform on the range of addresses, such as, for example, a write operation that includes a data buffer indicating what data to write to the range of addresses. As another example, XCopy command 500 may indicate that the exact same action should be done to every block within the address range, as will be explained in more detail below in regards to FIG. 7.

Figure 5:
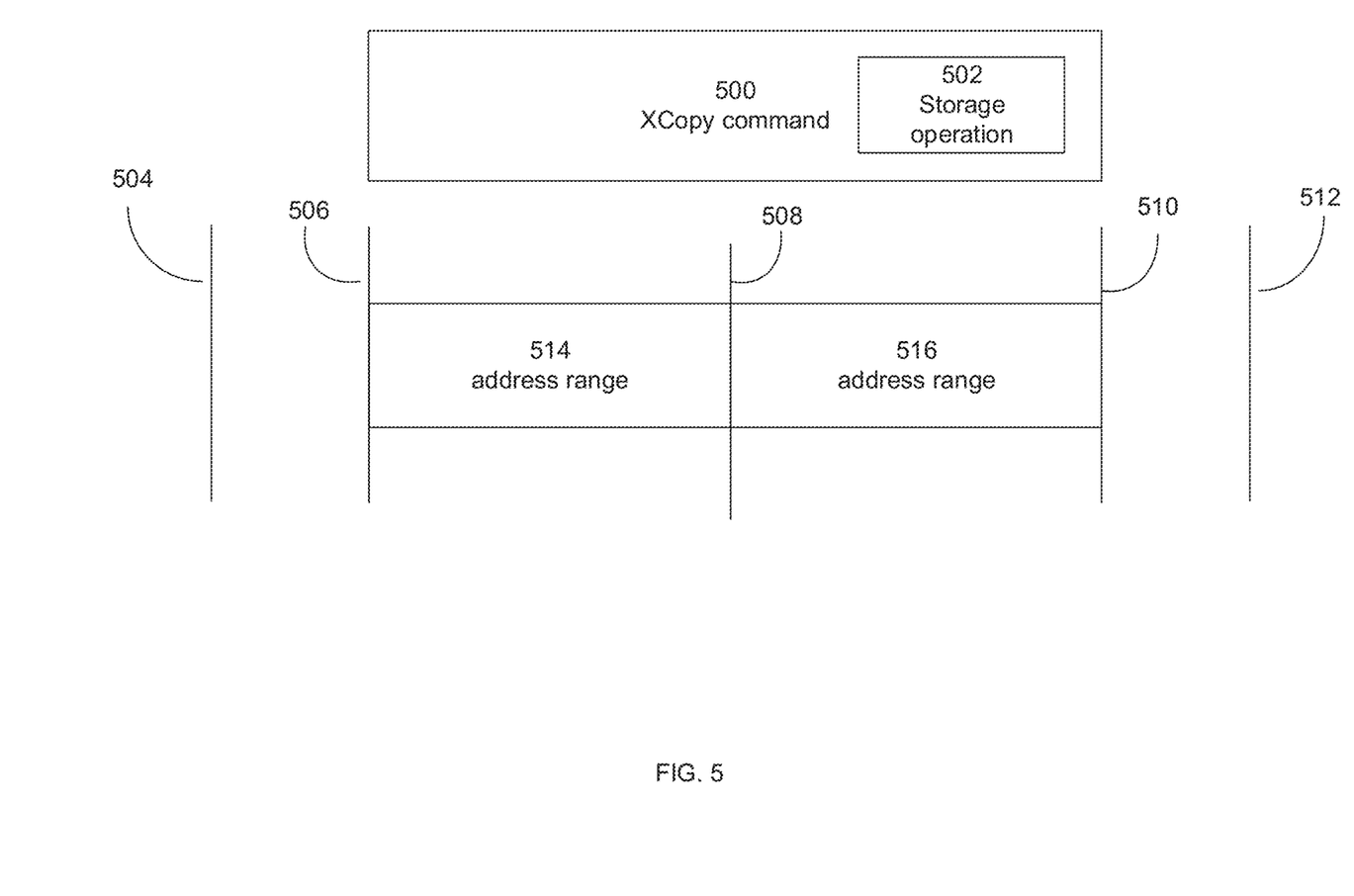
FIGS. 5-7 are example diagrammatic views of an efficient XCopy command process according to one or more example implementations of the disclosure.

In some embodiments, and referring in more detail to FIG. 5, XCopy command 500 may include a specific address range. For example, XCopy command 500 may be within an address range defined by alignment boundaries (e.g., alignment boundaries 504, 506, 508, 510, and 512) where XCopy command 500 may cover, for example, two full alignment regions (e.g., address range 514 and address range 516). Regarding address range 514 and address range 516, address range 514 and address range 516 may be converted into a set of addresses in a different address space. For example, XCopy command 500 may present an address range in a local address space of a LUN and that local address range may be converted into a universal address range over a space that allows all LUNs to be managed by XCopy command process 10. Continuing with the example, XCopy command 500 may indicate addresses 5-10 of a LUN; if the LUN is assigned a set of addresses ranging from 8,192 to 24,576, then the address range may be translated to 8,197-8,202. As another example, the universal address range may be an 8-petabyte (PB) range.

In some embodiments, XCopy command process 10 may issue a separate block-level XCopy command for each block within address range 514 and/or address range 516. A block-level XCopy command may include an address (e.g., within the universal address space) directed at a particular block. Each block may have a fixed length. For example, the block length may be 4 kilobytes (KB) in size or may be a fixed length that may range between 512 bytes and 64 KB. In addition, XCopy command 500 may include a storage operation (e.g., storage operation 502) and/or data to be written to that block. Storage operation 502 by itself may be an XCopy command.

In some embodiments, XCopy command 500 may be in the form of an IO operation, where the IO operation may be a subextent (hereinafter interchangeable referred to as "sub extent") block operation as opposed to a regular block operation, such as a read and/or write operation of a specified length. In contrast, a sub extent operation may be of a pre-determined fixed aligned size and may have a different operation code. Further, processing of a sub extent operation may be processed differently from a regular block operation, as described in more detail below. For example, XCopy command 500 may be treated as a range IO operation by a transactional cache memory system (e.g., cache memory system 172). Further, a source range and a destination range of XCopy command 500 may be determined 402 to be aligned within an alignment boundary (e.g., between alignment boundaries 504, 506, 508, 510, and 512). XCopy command 500 may be determined 402 to be smaller than a predetermined size. For example, an XCopy command having a source range and destination range aligned within 1 MB may be sent as a subextent block operation request (i.e., SubExtent BlockOps Request). If the source range and the destination range of XCopy command 500 are not aligned within the alignment boundary and/or XCopy command 500 is not smaller than a predetermined size, XCopy command 500 may be processed a read of source-extent operation and a write to a destination-extent operation, as described in U.S. patent application Ser. No. 17/084,085. In response to determining 402 the source range and the destination range of XCopy command 500 are aligned within the alignment boundary (e.g., between alignment boundaries 504, 506, 508, 510, and 512) and XCopy command 500 is smaller than a predetermined size, XCopy command 50 may be processed 404. Additionally, receiving of XCopy command 500 may be recorded 406 in a log.

Figure 4:
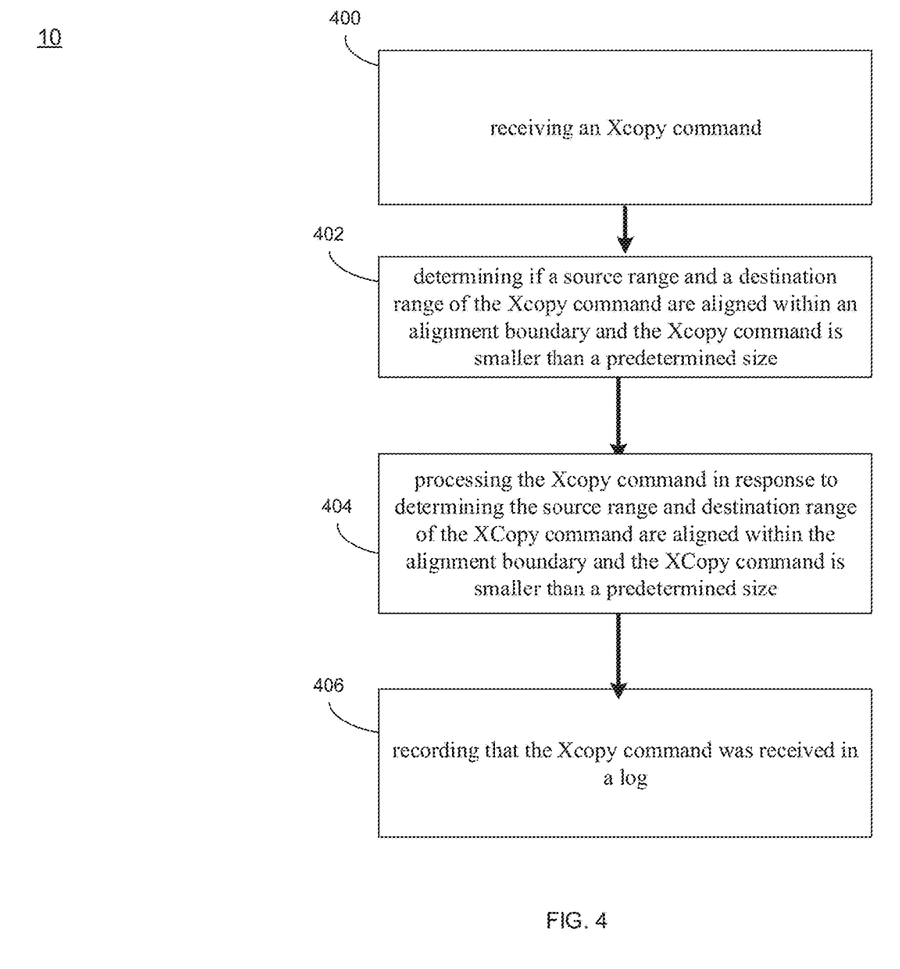
FIG. 4 is an example flowchart of an efficient implementation of an efficient XCopy command process according to one or more example implementations of the disclosure.
Figure 6:
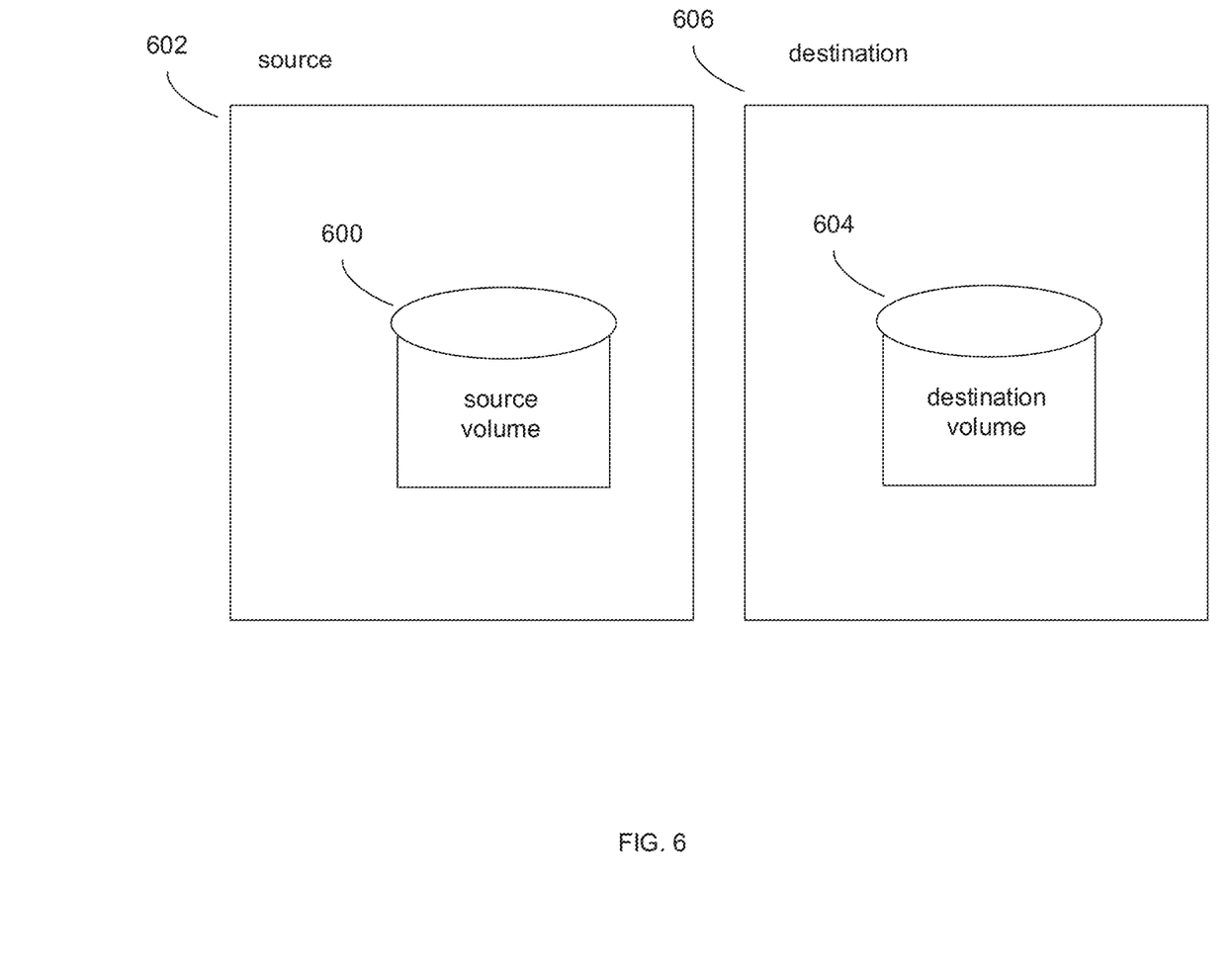

Referring in more detail to FIGS. 4-6, in some embodiments, processing 404 XCopy command 500, a locking mechanism within the cache memory system (e.g., cache memory system 172) may acquire a distributed shared lock on a source volume 600 associated with a source 602 of XCopy command 500. When the distributed shared lock is acquired, one or more pages associated with XCopy command 500 from source volume 600 may not be loaded. A distributed exclusive lock may also be acquired on one or more pages associated with a destination (e.g., destination volume 604 of destination 606) of XCopy command 500 (i.e., destination volume pages).

In some embodiments, and referring again to FIG. 6, the transactional cache memory system (e.g., cache memory system 172) may be utilized to determine if a barrier logical sequence number (LSN) is present that needs to be flushed from the transactional cache memory system (e.g., cache memory system 172) to permanent storage (e.g., hard disk drives, one or more solid-state/flash devices, etc.) after the distributed shared lock on source volume 600 associated with source 602 of XCopy command 500 is acquired. In general, a LSN may provide a time ordering in the log when a record is persisted to the log. Specifically, in regards to the barrier LSN, the LSN defines a barrier of a range of source volume 600 (i.e., a source range barrier LSN) and/or destination volume 604. The source range barrier LSN may be determined before recording in a log that XCopy command 500 was received. Specifically, the barrier LSN may be determined by taking the largest in size of the following: (1) an extent operation table; (2) largest of 256 dirty cache page descriptors, where the cache page descriptors are associated with metadata that hold up to 4K of data; (3) a barrier LSN in a sub extent record (e.g., a sub extent record that includes address ranges of XCopy command 500) found in a hash table; and (4) a creation LSN in a sub extent record found in a hash table where a creation LSN may be a LSN of the sub extent record when the sub extent record is persisted to the log and the creation LSN may be set to zero as a default value. Further, the source range barrier LSN may be used to help order storage operations that are to be flushed from a log to the transactional cache memory system (e.g., cache memory system 172).

In some embodiments, and referring again to FIG. 6, the transactional cache memory system (e.g., cache memory system 172) may be utilized to determine if the barrier LSN is within a range of the destination of XCopy command 500 (i.e., a destination range barrier LSN) in response to acquiring the distributed shared lock on destination volume 604. The destination range barrier LSN may be determined by the largest in size of the following: (1) the extent operation table; (2) the barrier LSN in the sub extent record found in the hash table; and (3) the creation LSN in the sub extent record found in the hash table. Further, the destination barrier LSN may be used to help order storage operations that are to be flushed from a log to the transactional cache memory system (e.g., cache memory system 172)

In some embodiments, and referring again to FIG. 6, the transactional cache memory system (e.g., cache memory system 172) may further be utilized to determine a previous LSN from the sub extent record within the destination range of XCopy command 500. The previous LSN may form the creation LSN in the sub extent record found in the hash table, as referenced above. Further, the previous LSN may indicate that a complete overwrite has occurred for a specific range (e.g., address range 514, address range 516). Further, the previous LSN may be utilized when flushing storage operations from a log to the transactional cache memory system (e.g., cache memory system 172), specifically allowing for data associated with the previous LSN (i.e., previously written data) to be skipped during the flush, which may help free storage resources earlier.

In some embodiments, XCopy command process 10 may then store the collected data regarding the source range and destination range of the barrier LSN (hereinafter "the collected data") and the previous LSN in a log. Specifically, the collected data may be stored in persisted storage associated with the log. The transactional cache memory system (e.g., cache memory system 172) may be notified of XCopy command 500 on a remote node of XCopy command 500 where a memory within the remote node includes a hash table that includes sub extent records. This may include a local node that receives XCopy command 500 and the remote node may be a peer node onto which will be notified about XCopy command 500 being received by the local node, which may provide high availability of data in the event one of the node goes down in an active-active storage array.

The memory of the remote node may be updated with the source range and the destination range of XCopy command 500 (e.g., the sub extent records associated with the source and destination range of XCopy command 500 may be updated). Specifically, the transactional cache memory system (e.g., cache memory system 172) may add/swap/update the sub extent records associated with the source and destination range of XCopy command 500 within the hash table. For example, the source range of XCopy command 500 may be added/swapped/updated to provide a barrier for further IO operations as well as allowing for the destination range to be aware of modifications to the source range.

In some embodiments, XCopy command process 10 may update the source range of XCopy command 500 in the hash table. For example, if a sub extent record found in the hash table is determined to be dirty, an existing barrier LSN (as discussed above) may be updated in the sub extent record with the new creation LSN (as discussed above) if the creation LSN is larger in size than its previous value currently located in the hash table. If the sub extent record found in the hash table is determined to be clean, the sub extent record may be removed from the hash table. Further, the determined source range (as discussed above) may then be added to the hash table as a sub extent record and the barrier LSN may be set to the new creation LSN.

In some embodiments, XCopy command process 10 may update the destination range of XCopy command 500 in the hash table. In updating the destination range of XCopy command 500, it may first be determine whether a sub extent record is present in the hash table (i.e., an initial sub extent record). If so, it may be removed. The new XCopy destination range may then be added to the hash table as a new sub extent record. The barrier LSN may then be set to the value of the sub extent record that was removed as long as a tail has not moved pass the barrier LSN where the tail may denote a LSN up to which data persisted in the log has been flushed. Further, the creation LSN may be set to a predetermined value assigned to XCopy command 500 by the log. Also, it may need to be determined whether an existing snapshot of a volume (e.g., source volume 600 and/or destination volume 604) or the source range of the barrier LSN is within the destination range. If so, the initial sub extent record needs to be saved. If not, the initial sub extent record may be released/freed from the hash table.

In some embodiments, destination volume 604 of destination 606 may include one or more existing pages where the one or more pages may be clean and/or dirty. For example, if a clean page is found on destination volume 604, the clean page may be purged from the transactional cache memory system (e.g., cache memory system 172. If a dirty page is found on destination volume 604, XCopy command process 10 may determine if the dirty page is associated with a previously taken snapshot and/or an earlier received XCopy command. If the dirty page is associated with a previously taken snapshot and/or an earlier received XCopy command, the dirty page may be retained in the transactional cache memory system (e.g., cache memory system 172) and annotated with a flag that indicates the page is useable only by a snapshot. For a page that is determined to not be associated with a previously taken snapshot and/or an earlier received XCopy command, the dirty page may be purged from the cache of cache memory system 172. When purging the dirty page, the cache of cache memory system 172 may utilize a LSN (i.e., a log offset) in a page descriptor of the dirty page to determine whether the dirty page can be purged.

In some embodiments, after a clean page is purged from destination volume 604, and/or a dirty page is retained in the cache of cache memory system 172, and/or a dirty page is purged from the cache of cache memory system 172, the distributed shared lock on source volume 600 associated with source 602 and destination volume 604 of destination 606 may both be released.

In some embodiments, and as discussed above, if an existing barrier LSN is identified by the, the transactional cache memory system (e.g., cache memory system 172), the transactional cache memory system (e.g., cache memory system 172) may determine if the barrier LSN needs to be flushed before XCopy command 500 is written to the transactional cache memory system (e.g., cache memory system 172). In order to determine which specific barrier LSN that needs to be flushed before the IO range of XCopy command 500 a larger LSN of either: (1) the extent operation; (2) or the barrier LSN associated with a sub extent record in the hash table. After which barrier LSN is determined that needs to be flushed, the barrier LSN may be stored in a page buffer within the transaction cache memory system (e.g., cache memory system 172). As such, the barrier LSN may be used to save a previous version of a page associated with XCopy command 500 for a snapshot to be taken of a system or a later XCopy command.

In some embodiments, and referring again in more detail to FIG. 6, when XCopy command 500 is processed by XCopy command process 10, there is a possibility that multiple XCopy commands may be processed at once, which may result in multiple XCopy extents directed to source volume 600 and/or destination volume 604 of the XCopy commands (i.e., XCopy Src/Dst SubExtents). As such, when an XCopy command 500 needs to be loaded from a destination of XCopy command 500 (e.g., destination volume 604), multiple redirections may be required. Therefore, XCopy command process 10 may include an exception rule where the path of loading XCopy command 500 where XCopy command process 10 may request a force flush from the log to the transactional cache memory system (e.g., cache memory system 172). For example, a read exception rule may exist in regards to destination 606 of XCopy command 500 when a read of XCopy command 500 requires a redirect to source 602 of XCopy command 500, specifically to an extent identifier of source 602 and/or to an offset of XCopy command 500 where the offset may be an IO offset for which a read operation is trying to load a page from destination 606 and either: (1) the source extent is a snapshot operation and a page associated with XCopy command 500 cannot be loaded (i.e., the read operation cannot be satisfied) where the source extent may be an extent operation record that was found in a volume associated with source volume 600 (i.e., source volume 600 may itself be a snapshot or another volume); or (2) the source range is an XCopy destination range. As such, the read of XCopy 500 may pause and the log may flush the XCopy destination creation LSN to the transactional cache memory system (e.g., cache memory system 172). Once the XCopy destination creation LSN has been flushed from the log to the transactional cache memory system (e.g., cache memory system 172), the read operation may restart. As another example, while XCopy command 500 may be read, a snapshot operation may also be processed where the snapshot operation may require a redirect to an extent identifier of a parent snapshot (e.g., patent extent ID that includes a unique identifier of parent extent, as described below) and/or offset and either: (1) a parent extent (e.g., volume on which a snapshot is dependent on) includes a chain that is deep and a read of the snapshot operation cannot load a page associated with snapshot operation (i.e., the read operation cannot be satisfied); and (2) the source range is an XCopy destination range. As such, the read of the snapshot operation may pause and the log may flush the snapshot to the transactional cache memory system (e.g., cache memory system 172), specifically a snapshot operation creation LSN. Once the snapshot operation creation LSN has been flushed from the log to the transactional cache memory system (e.g., cache memory system 172), the read operation may restart.

Figure 7:
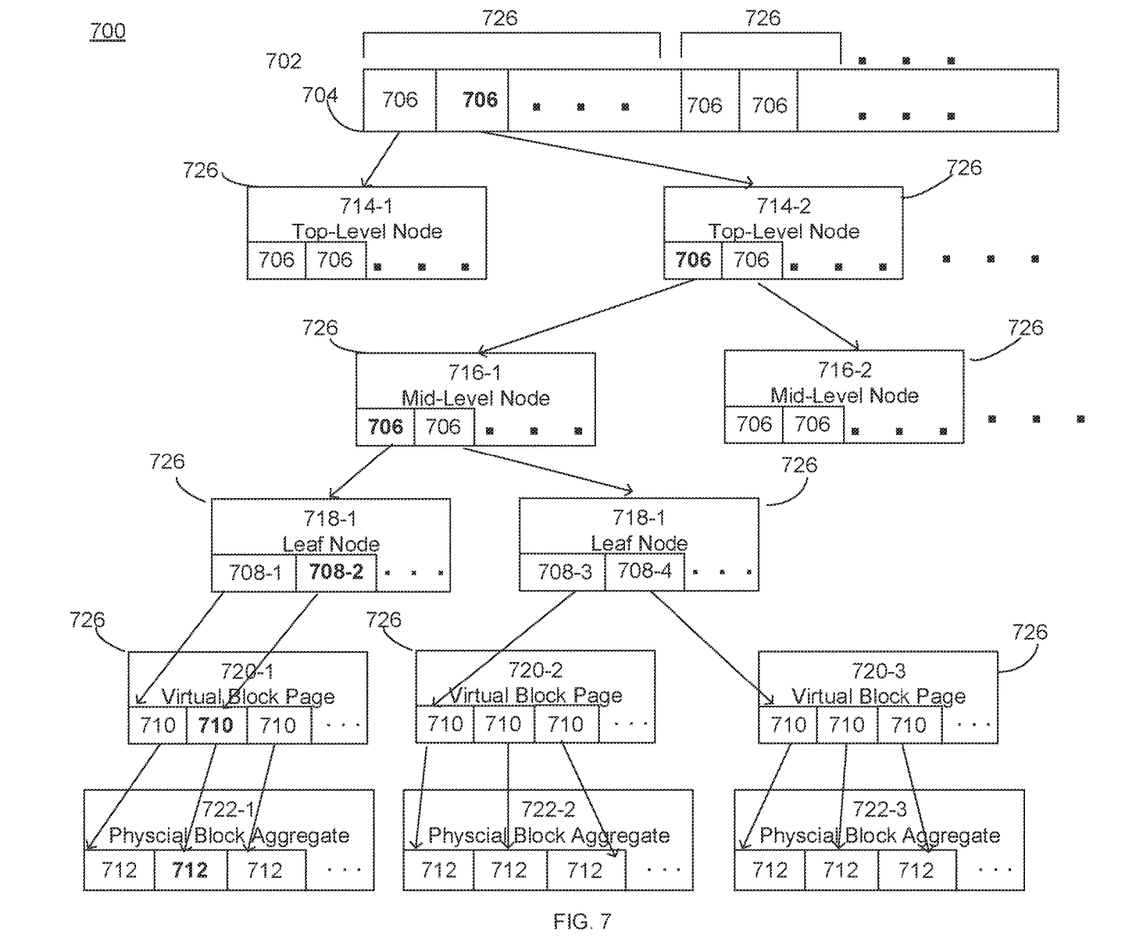

In some embodiments, and referring to FIG. 7, an example data structure arrangement 700 in the context of performing a READ operation on data associated with XCopy command 500 is shown. Specifically, arrangement 700 may include a metadata hierarchy (hereinafter "MMH") 702 for locating blocks of data associated with XCopy command 500 where a position within MMH 702 may indicate an address or address range of the data. MMH 702 may be a collection of B-trees (or a B-tree-like structures), and it may include a root structure 704, a set of top-level nodes 714 (depicted as top-level nodes 714-1, 714-2 . . . ), a set of mid-level nodes 716 (depicted as mid-level nodes 716-1, 716-2 . . . ), a set of leaf nodes 718 (depicted as leaf nodes 718-1, 718-2 . . . ), and a set of virtual block pages (depicted as virtual block pages 720-1, 720-2, 720-3 . . . ).

In some embodiments, MMH 702 may address a large logical address space, such as, for example 8 PB. Each entry in root structure 704 may be a node pointer 706 that points to top-level node 714. Top-level node 714 may contain a plurality of node pointers 706 that each point to a mid-level node 716. Mid-level node 7146 may contain a plurality of node pointers 706 that each point to leaf node 718. Leaf node 718 may contain a plurality of virtual block pointers 708 that each point to a virtual block entry 710 within a virtual block page 720. As depicted, each node 714, 716, and 718 may be implemented as a metadata page 726. In some embodiments, each metadata page 726 may be 4 kilobytes (KB), holding up to 512 node pointers 404 or virtual block pointers 405 plus a header and/or footer. Root structure 402 may also be made up of a plurality of metadata pages 726, each of which may store 512 node pointers 706. Further, each virtual block page 720 may be made up of one or more metadata page 726 containing a plurality of virtual block entries 710. Each virtual block entry 710 may point to a user data block 712, and several user data blocks 712 may be aggregated together into a physical block aggregate 722 (depicted as physical block aggregate 722-1, 722-0, 722-0 . . . ). In an example, physical block aggregate 720 may be 2 MB, and physical block 720 may be 4 KB. In another example, each physical block 720 may be compressed, allowing up to 2048 compressed physical blocks 722 to be stored within a single physical block aggregate 720.

In some embodiments, and referring in more detail to FIG. 7 as shown in a bold font, XCopy command 500 may be directed at second physical block 722 from the left within physical block aggregate 722-1, which has a logical address corresponding to the position of pointer 708-2 (part of leaf node 718-1) within MMH 702. In order to read physical block 712, it must be located, which involves traversing the MMH 702 and reading several metadata pages 726 along the way, including one metadata page 726 of each of the root structure 704, top-level node 714-1, mid-level node 716-1, leaf node 718-1, and virtual block page 720-1.

While the above examples and explanation illustrate XCopy command process 10 being utilized with an XCopy command operation (e.g., XCopy command 500), this is for example purposes only and should not be understood as limiting the scope only to XCopy command operations. For example, XCopy command process may be utilized with other storage operations such as UNMAP and/or WRITE-SAME operations.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   receiving, via a computing device, an XCopy command, wherein the XCopy command is in the form of an IO operation, wherein the IO operation is a subextent block operation;
   determining if a source range and a destination range of the XCopy command are aligned within an alignment boundary and the XCopy command is smaller than a predetermined size;
   in response to determining the source range and destination range of the XCopy command are aligned within the alignment boundary and the XCopy command is smaller than a predetermined size, processing the XCopy command; and
   recording, in a log, that the XCopy command was received.

2. The computer-implemented method of claim 1, wherein the XCopy command is received without performing a read of a source logical block address (LBA) associated with the XCopy command and without writing read data of the XCopy command to a destination LBA.

3. The computer-implemented method of claim 1, further comprising acquiring a distributed shared lock on a source volume associated with a source of the XCopy command and acquiring a distributed exclusive lock on a destination volume page associated with a destination of the XCopy command.

4. The computer-implemented method of claim 3, wherein acquiring a distributed shared lock on a source volume associated with a source of the XCopy command is configured to not load a page from the source volume associated with the source of the XCopy command.

5. The computer-implemented method of claim 1, further comprising updating a hash table using the source range and the destination range.

6. The computer-implemented method of claim 1, further comprising determining if there is a barrier logical sequence number (LSN) within a transactional cache to be flushed before recording in the log that the XCopy command was received.

7. The computer-implemented method of claim 1, further comprising pausing a read of the XCopy command and flushing a logical sequence number (LSN) associated with a destination of the XCopy command.

8. A computer program product residing on a non-transitory computer readable storage medium having a plurality of instructions stored thereon which, when executed across one or more processors, causes at least a portion of the one or more processors to perform operations comprising:
   receiving an XCopy command, wherein the XCopy command is in the form of an IO operation, wherein the IO operation is a subextent block operation;
   determining if a source range and a destination range of the XCopy command are aligned within an alignment boundary and the XCopy command is smaller than a predetermined size;
   in response to determining the source range and destination range of the XCopy command are aligned within the alignment boundary and the XCopy command is smaller than a predetermined size, processing the XCopy command; and
   recording, in a log, that the XCopy command was received.

9. The computer program product of claim 8, wherein the XCopy command is received without performing a read of a source logical block address (LBA) associated with the XCopy command and without writing read data of the XCopy command to a destination LBA.

10. The computer program product of claim 8, further comprising acquiring a distributed shared lock on a source volume associated with a source of the XCopy command and acquiring a distributed exclusive lock on a destination volume page associated with a destination of the XCopy command.

11. The computer program product of claim 10, wherein acquiring a distributed shared lock on a source volume associated with a source of the XCopy command is configured to not load a page from the source volume associated with the source of the XCopy command.

12. The computer program product of claim 8, further comprising updating a hash table using the source range and the destination range.

13. The computer program product of claim 8, further comprising determining if there is a barrier logical sequence number (LSN) within a transactional cache to be flushed before recording in the log that the XCopy command was received.

14. The computer program product of claim 8, further comprising pausing a read of the XCopy command and flushing a logical sequence number (LSN) associated with a destination of the XCopy command.

15. A computing system comprising:
   a memory; and
   a processor configured to receive an XCopy command, wherein the XCopy command is in the form of an TO operation, wherein the TO operation is a subextent block operation, wherein the processor is further configured to determine if a source range and a destination range of the XCopy command are aligned within an alignment boundary and the XCopy command is smaller than a predetermined size, wherein the processor is further configured to process, in response to determining the source range and destination range of the XCopy command are aligned within the alignment boundary and the XCopy command is smaller than a predetermined size, the XCopy command, wherein the processor is further configured to record, in a log, that the XCopy command was received.

16. The computing system of claim 15, wherein the XCopy command is received without performing a read of a source logical block address (LBA) associated with the XCopy command and without writing read data of the XCopy command to a destination LBA.

17. The computing system of claim 15, wherein acquiring a distributed shared lock on a source volume associated with a source of the XCopy command and acquiring a distributed exclusive lock on a destination volume page associated with a destination of the XCopy command.

18. The computing system of claim 17, wherein acquiring a distributed shared lock on a source volume associated with a source of the XCopy command is configured to not load a page from the source volume associated with the source of the XCopy command.

19. The computing system of claim 15, wherein the processor is further configured to:
- update a hash table using the source range and the destination range; and
- determine if there is a barrier logical sequence number (LSN) within a transactional cache to be flushed before recording in the log that the XCopy command was received.

20. The computing system of claim 15, wherein the processor is further configured to pause a read of the XCopy command and flushing a logical sequence number (LSN) associated with a destination of the XCopy command.

* * * * *